United States Patent [19]
Komurasaki

[11] Patent Number: 5,150,606
[45] Date of Patent: Sep. 29, 1992

[54] ACCELERATION DETECTOR
[75] Inventor: Satoshi Komurasaki, Himeji, Japan
[73] Assignee: Mitsubishi Denki K.K., Tokyo, Japan
[21] Appl. No.: 559,798
[22] Filed: Jul. 30, 1990
[30] Foreign Application Priority Data
  Aug. 1, 1989 [JP] Japan .................................. 1-198023
[51] Int. Cl.[5] ............................................ G01P 15/09
[52] U.S. Cl. ........................................ 73/35; 310/329
[58] Field of Search ............. 73/35 KR, 35 KS, 35 K, 73/35 I, 35 M, 35 P, 654; 310/329

[56] References Cited
U.S. PATENT DOCUMENTS

| | | | |
|---|---|---|---|
| 3,307,054 | 2/1967 | Shoor .................... | 310/329 |
| 4,399,705 | 8/1983 | Weiger et al. .......... | 73/654 |
| 4,949,571 | 8/1990 | Komurasaki ........... | 73/35 P |
| 4,964,294 | 10/1990 | Kawajiri et al. ....... | 73/35 P |
| 4,966,031 | 10/1990 | Mochizuki ............. | 73/35 P |

Primary Examiner—Hezron E. Williams
Assistant Examiner—Michael Brock
Attorney, Agent, or Firm—Sughrue, Mion, Zinn, Macpeak & Seas

[57] ABSTRACT

An acceleration detector comprising a substantially hollow cylindrical acceleration transducer assembly including a piezoelectric element, an inertial weight and an output terminal in a stacked relationship. The acceleration transducer assembly is mounted on a cylindrical threaded bushing of a housing and is secured by a stop nut thread-engaged on the bushing. The stop nut has a contact surface at which the stop nut contacts and supports the inertial weight of the transducer assembly for securing the transducer assembly to the bushing. The contact surface is small enough to enable to obtain a substantially constant output over an oscillation frequency range of the acceleration to be detected.

3 Claims, 2 Drawing Sheets

ACCELERATION DETECTOR

BACKGROUND OF THE INVENTION

This invention relates to an acceleration detector and more particularly to an acceleration detector for detecting knocking in an internal combustion engine.

FIGS. 1 and 2 illustrate one example of a conventional acceleration detector. The acceleration detector comprises a housing 1 defining an annular cavity 2 therein and an annular acceleration transducer assembly 3 disposed within the cavity 2. The housing 1 comprises a tubular, electrically conductive metallic bushing 4 having a through hole 5 and a flange 6. The housing 1 also comprises a ring-shaped risinous outer case 7 bonded by a bonding agent 7a to the flange 6 of the bushing 4 so that the cavity 2 is defined therein.

The outer case 7 also has a connector 8 radially outwardly extending from the outer case 7 so that an external output terminal 9 can extend through the connector 8 for taking out an output signal from the acceleration transducer assembly 3 disposed within the cavity 2. The acceleration transducer assembly 3 further includes an annular piezoelectric element 11 placed on the terminal plate 10, a washer-shaped output terminal 12 including a lead 12a connected to the external output terminal 9, an electrically insulating washer 13 disposed on the output terminal 12, an annular inertial weight 14 placed on the insulating washer 13 and a threaded ring-shaped stop nut 15 thread-engaged with the thread 4a on the tubular bushing 4. An electrically insulating tape or tube 16 is placed on the tubular bushing 4 so that the acceleration transducer assembly 3 is insulated from the bushing 4 even when the output terminal 12 as well as the piezoelectric element 11 are eccentrically assembled.

In order to resiliently support and protect the acceleration transducer assembly 3 within the cavity 2 from undesirable environmental conditions, the remaining space of the cavity 2 of the housing 1 which is not occupied by the acceleration transducer assembly 3 is substantially filled with a resilient filler material 17 of a thermo-setting resin. The filler material 17 must be sufficiently resilient after it is cured to allow the movement of the inertial weight 14 relative to the housing 1 when an acceleration is applied to the inertial weight 14 so that the piezoelectric element 11 generates a voltage signal proportional to the pressure exterted on it by the relative movement of the inertial weight 14 against the piezoelectric element 11.

When in use, the acceleration detector is securely mounted on the internal combustion engine (not shown) by a suitable bolt (not shown) inserted into the central through hole 5 of the housing 1. The acceleration or the vibration of the internal combustion engine produces the movement of the inertial weight 14 relative to the housing 1, which causes the piezoelectric element 11 to be stressed by the inertial weight 14, whereby an electrical signal indicative of the movement of the inertial weight 14 relative to the engine is generated from the piezoelectric element 11. The electrical signal is provided from the output terminal 9 analyzed to determine whether knocking of the internal combustion engine is involved. One example of the output from the output terminal 9 is illustrated by a curve A in FIG. 3. When it is determined that a knocking signal is contained in the electrical signal, the operating parameters for operating the engine can be adjusted to increase the output power or decrease the fuel consumption rate.

In the conventional acceleration detector as above described, the output signal indicative of the acceleration supplied from the acceleration detector varies relatively significantly according to the frequency of the oscillation as shown by the curve A in FIG. 3 in which output voltage is plotted against the oscillation frequency with a constant magnitude of the oscillation. As seen from the curve A, the output voltage gradually increases as the oscillation frequency increases over a wide oscillation frequency range of the acceleration to be detected and the slope of the curve A is particularly steep in a higher frequency range of more than about 10 kHz. Moreover, there is an abrupt change with a high peak and a deep valley at the oscillation frequency around the frequency range well above 10 kHz. This is undesirable because the detection characteristics of the acceleration transducer assembly 3 is disturbed and the output of the detector does not correctly indicate the magnitude of the acceleration.

SUMMARY OF THE INVENTION

Accordingly, one object of the present invention is to provide an acceleration detector free from the above discussed problems.

Another object of the present invention is to provide an acceleration detector in which the output signal voltage generated by the acceleration detector is constant over an oscillation frequency range of the acceleration to be detected.

Another object of the present invention is to provide an acceleration detector in which the output voltage characteristics of the detector is made flat and constant.

Still another object of the present invention is to provide an acceleration detector that is accurate and still simple in structure.

Still another object of the present invention is to provide an acceleration detector which is light in weight and capable of exhibiting a smooth oscillation frequency characteristic curve.

With the above objects in view, the acceleration detector of the present invention comprises a housing defining a cavity therein and including a substantially cylindrical threaded bushing, a substantially hollow cylindrical acceleration transducer assembly mounted on the bushing in the cavity and including a piezoelectric element, an inertial weight and an output terminal, and a stop nut thread-engaged on the bushing. The stop nut comprises a contact surface at which the stop nut contacts and supports the inertial weight of the transducer assembly for securing the transducer assembly to the bushing, the contact surface being small enough to enable to obtain a substantially constant output over an oscillation frequency range of the acceleration to be detected.

The stop nut may have a substantially rectangular cross section, the contact surface may be substantially annular, and the radial width dimension of the contact surface may be of about 70% of the radial width dimension of the inertial weight.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
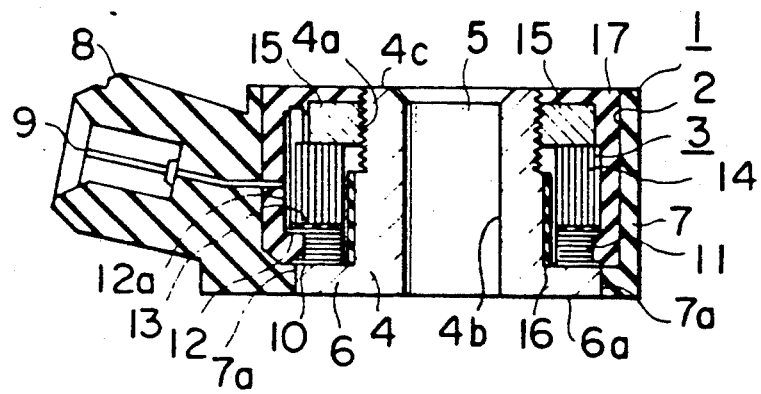
FIG. 1 is a sectional side view illustrating one example of a conventional acceleration detector.
Figure 4:
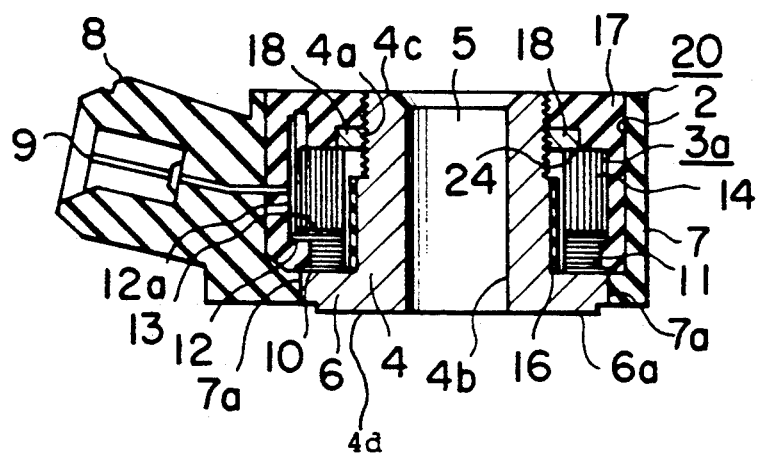
FIG. 4 is a sectional side view illustrating the acceleration detector of the present invention.

The acceleration detector, as shown in FIG. 4 of the present invention has a basic structure similar to that described and illustrated in conjunction with FIG. 1. More particularly, the acceleration detector comprises a housing 20 defining an annular cavity 2 therein and an annular acceleration transducer assembly 3a disposed within the cavity 2. The housing 20 comprises a tubular, electrically conductive metallic bushing 4 having a through hole 5 and a flange 6. The housing 1 also comprises a ring-shaped resinous outer case 7 bonded by a bonding agent 7a to the flange 6 of the bushing 4 so that the cavity 2 is defined therein. The bushing 4 has at its bottom surface a ring-shaped bearing surface 4d at which the housing 20 is brought into engagement with an internal combustion engine (not shown) when the detector is mounted by a mounting screw (not shown).

The outer case 7 also has a connector 8 radially outwardly extending from the outer case 7 so that an external output terminal 9 can extend through the connector 8 for taking out an output signal from the acceleration transducer assembly 3a disposed within the cavity 2. The acceleration transducer assembly 3a further includes an annular piezoelectric element 11 placed on the terminal plate 10, a washer-shaped output terminal 12 including a lead 12a connected to the external output terminal 9, an electrically insulating washer 13 disposed on the output terminal 12, an annular inertial weight 14 placed on the insulating washer 13 and a threaded ring-shaped stop nut 18 thread-engaged with the thread 4a on the tubular bushing 4. An electrically insulating tape or tube 16 is placed on the tubular bushing 4 so that the acceleration transducer assembly 3a is insulated from the bushing 4 even when the output terminal 12 as well as the piezoelectric element 11 are eccentrically assembled.

In order to resiliently support and protect the acceleration transducer assembly 3a within the cavity 2 from undesirable environmental conditions, the remaining space of the cavity 2 of the housing 20 which is not occupied by the acceleration transducer assembly 3a is substantially filled with a resilient filler material 17 of a thermo-setting resin. The filler material 17 must be sufficiently resilient after it is cured to allow the movement of the inertial weight 14 relative to the housing 20 when an acceleration is applied to the inertial weight 14 so that the piezoelectric element 11 generates a voltage signal proportional to the pressure exterted on it by the relative movement of the inertial weight 14 against the piezoelectric element 11.

Figure 2:
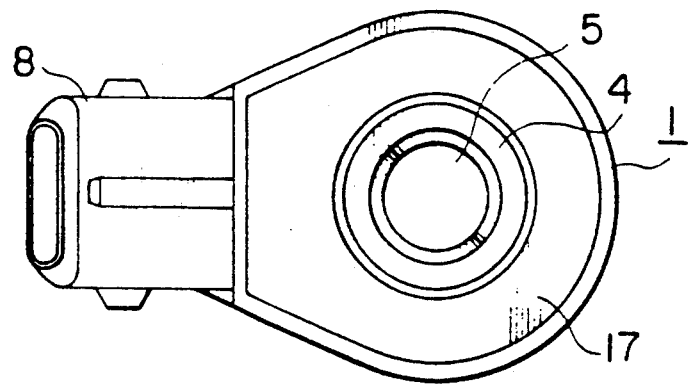
FIG. 2 is a plan view of the acceleration detector illustred in FIG. 1.
Figure 5:
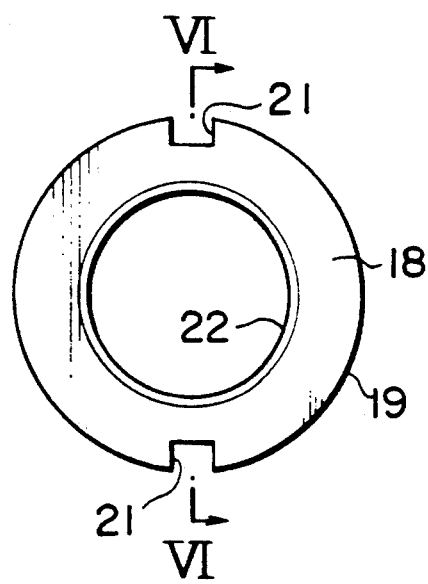
FIG. 5 is a plan view illustrating one example of the stop nut of the present invention.
Figure 6:
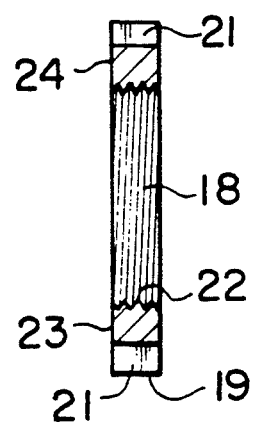
FIG. 6 is a sectional side view taken along line VI—VI of FIG. 5.
Figure 7:
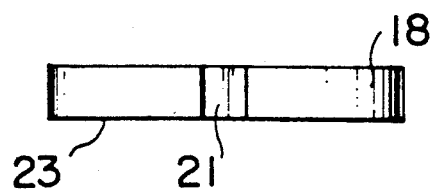
FIG. 7 is a front view of the stop nut illustrated in FIG. 5.

According to the present invention, the ring-shaped stop nut 18 thread-engged on the outer thread 4a of the bushing 4 is much smaller than the stop nut 15 of the conventional acceleration detector illustrated in FIGS. 1 and 2. The general configuration of the stop nut 18 is illustrated in FIGS. 5 to 7 from which it is seen that the stop nut 18 is a generally ring-shaped member having a rectangular cross section. The stop nut 18 is provided in its outer cylindrical surface 19 with a pair of diametrically opposed axial grooves 21 for the engagement of a suitable tool (not shown) for tightening and loosening the stop nut 18 on the bushing 4. The stop nut is also provided in its inner cylindrical surface an inner thread 22 for thread-engaging with the outer thread 4a of the bushing 4. When the stop nut is thread-engaged on the bushing 4, one of the annular end surfaces 23 engages the top surface of the inertial weight 14 of the transducer assembly 3a at a contact surface 24 to support it on the bushing 4.

Comparing the stop nut 15 illustrated in FIG. 1 with the stop nut 18 according to the present invention, it is understood that the contact surface 24 of the stop nut 18 is significantly smaller than the contact surface of the stop nut 15 of the conventional design illustrated in FIG. 1 and is small enough to enable to obtain a substantially constant output over an oscillation frequency range of the acceleration to be detected. In a preferred embodiment, the radial width dimension of the contact surface 24 of the stop nut is of about 70% of the radial width dimension of the inertial weight 14.

Figure 3:
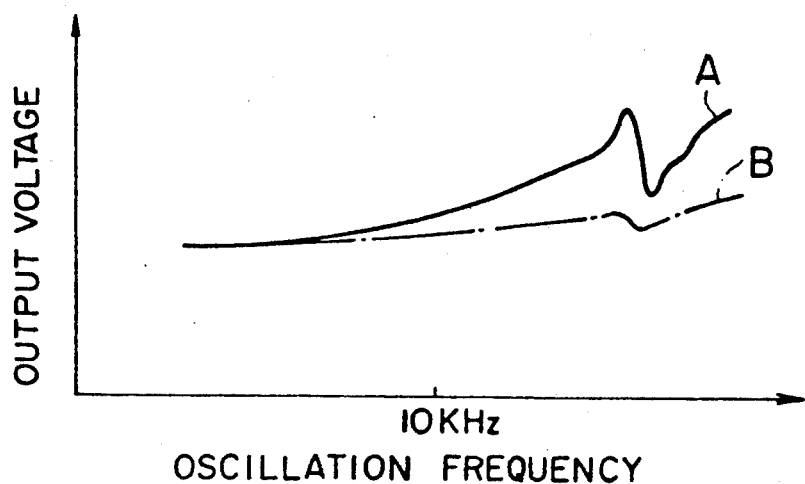
FIG. 3 is a graph illustrating the output characteristics of the acceleration detector of the conventional design and the present invention.

In one example in which the outer diameter of the bearing surface 4d of the bush 4 is 20 mm, the stop nut 18 has an outer diameter of 20 mm, an inner diameter of 16 mm and a height of 2 mm, and said inertial weight has an outer diameter of 24 mm and an inner diameter of 18 mm. The output voltage from the acceleration detector of the above example of the present invention plotted against the oscillation frequency at a constant magnitude is illustrated in FIG. 3 by a curve B, from which it is seen that the output voltage characteristic curve of the acceleration detector of the present invention is substantially flat over a wide oscillation frequency range and the slope of the curve B is slightly noticeable in a frequency range well exceeding 10 kHz. Moreover, the abrupt change with a high peak and a deep valley observed in the curve A disappears and only a small waveform is left, ensuring that the output of the detector correctly indicates the magnitude of the acceleration. Therefore, the acceleration detector of the present invention is accurate and still simple in structure, and is light-weight and capable of exhibiting a smooth oscillation frequency characteristic curve.

What is claimed is:

1. An acceleration detector comprising:
   a housing defining a cavity therein and including a substantially cylindrical threaded bushing;
   a substantially hollow cylindrical acceleration transducer assembly mounted on said bushing in said cavity and including a piezoelectric element, an inertial weight and an output terminal in a stacked relationship; and
   a stop nut thread-engaged on said bushing and having a contact surface at which said stop nut contacts and supports said inertial weight of said transducer assembly for securing said transducer assembly to said bushing, said contact surface maintaining a radial width dimension smaller than a radial width dimension of said inertial weight to enable said acceleration detector to obtain a substantially constant output over an oscillation frequency range of the acceleration to be detected;

wherein said stop nut has a substantially rectangular cross section, said contact surface is substantially annular, and the radial width dimension of said contact surface is of about 70% of the radial width dimension of said inertial weight.

2. An acceleration detector as claimed in claim 1, wherein said stop nut has an outer diameter of 20 mm, an inner diameter of 16 mm and a height of 2 mm, and said inertial weight has an outer diameter of 24 mm and an inner diameter of 18 mm.

3. An acceleration detector as claimed in claim 2, wherein said bushing has a bearing surface in engagement with a body which is the object of acceleration measurement.

* * * * *